May 12, 1925.
J. KEMPER
SAW SETTING DEVICE
Filed Sept. 4, 1924
1,537,357
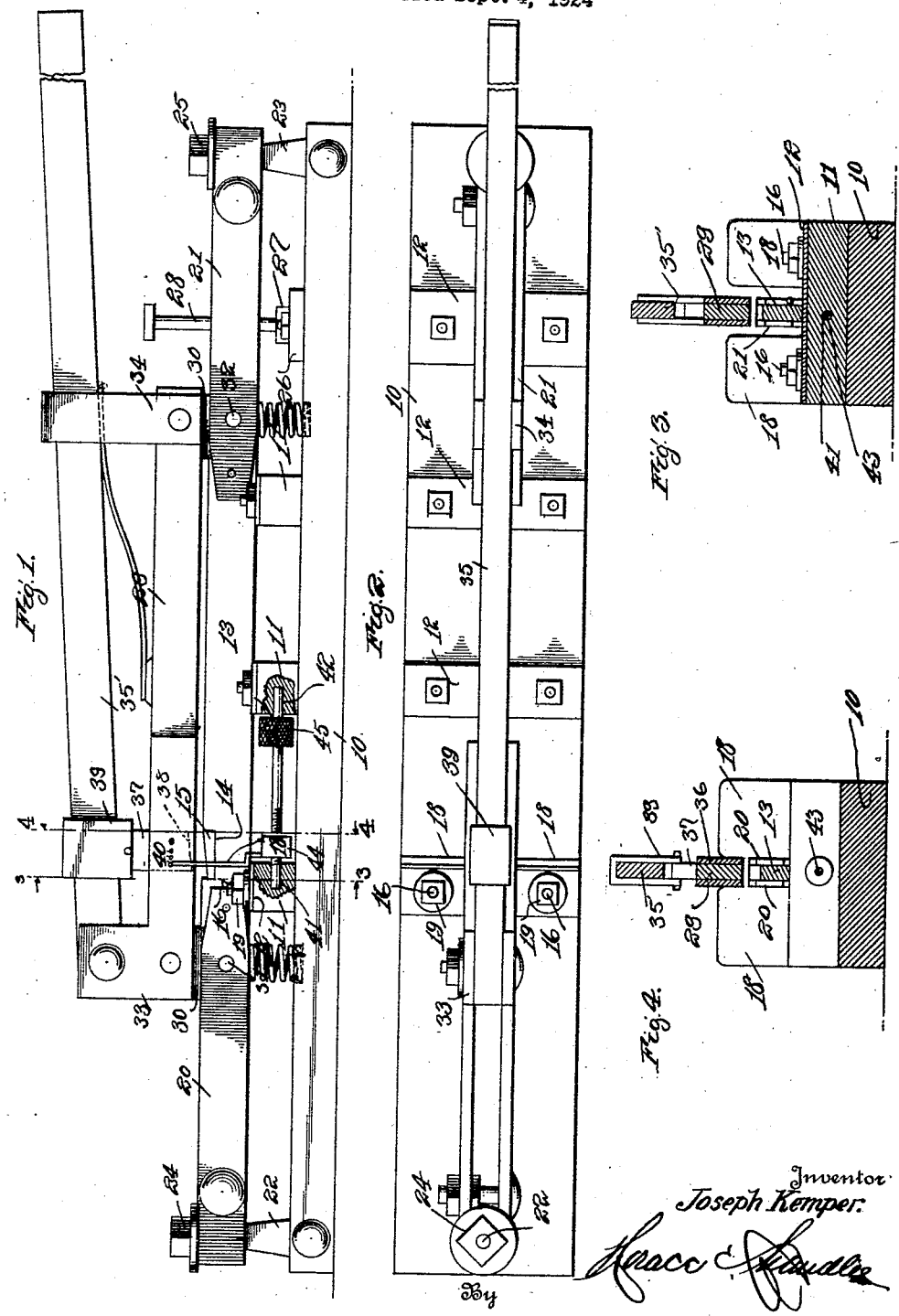
Inventor
Joseph Kemper
By
Attorney Patented May 12, 1925.

1,537,357

UNITED STATES PATENT OFFICE.

JOSEPH KEMPER, OF GREER, IDAHO.

SAW-SETTING DEVICE.

Application filed September 4, 1924. Serial No. 735,912.

*To all whom it may concern:*

Be it known that I, JOSEPH KEMPER, a citizen of the United States, residing at Greer, in the county of Clearwater, State of Idaho, have invented certain new and useful Improvements in Saw-Setting Devices; and I do hereby declare the following to be a full, clear, and exact description of the invention, such as will enable others skilled in the art to which it appertains to make and use the same.

This invention relates to new and useful improvements in saw treating devices and particularly to devices for setting the teeth of saws.

One object of the invention is to provide a device by means of which the teeth of differently sized saws may be quickly and accurately set.

Another object is to provide a device of this character wherein the saw is properly held while the punch is being operated, and thus prevent the saw from slipping.

Another object is to provide a device of this character which is adjustable for use with blades of different thicknesses.

Other objects and advantages will be apparent from the following description when taken in connection with the accompanying drawing.

In the drawing:

Figure 1 is a side elevation of a saw-setting machine made in accordance with the present invention, Fig. 2 is a top plan view of the same, Fig. 3 is a vertical transverse sectional view on the line 3—3 of Fig. 1, and Fig. 4 is a vertical transverse sectional view on the line 4—4 of Fig. 1.

Referring particularly to the accompanying drawing, 10 represents an elongated base on which are secured the transverse blocks 11. Secured to the upper faces of these blocks are the metal plates 12, and secured to the upper faces of these metal plates, and extending longitudinally of the base, is a metal bar 13, said bar having a longitudinally inclined notch or recess 14 in its upper edge, adjacent one end thereof, and detachably secured in said plate is the inclined anvil plate 15. Disposed vertically at each side of the bar 13, is the vertical wing 17 of an angular gage plate 18, to which more specific reference will be made later herein. Pivotally connected to the ends of the bar 13 are adjusting members which comprise the metal plates or bars 20 and 21, respectively, the outer ends of which straddle the vertical bolts 22 and 23, which are pivotally mounted on the base 10, nuts 24 and 25 being engaged on the upper edges of said plates 20 and 21. Secured to the base 10, beneath the plates 21, is a transverse plate 26, on the upper face of which is formed a central threaded boss 27, and threaded into this boss is a vertical bolt 28, which serves as a stop for the operating lever, which will be described later herein.

Disposed longitudinally above the bar 13, is a bar 29, said bar being slightly longer than the bar 13, and formed on the ends of the bar 29, and extending downwardly between the plates 20 and 21, respectively, are the lugs 30, said lugs being pivotally connected to said plates, as shown at 31 and 32, respectively. Formed integrally with the ends of the bar 29, and extending vertically therefrom, are the arms 33 and 34, the former being bifurcated and having one end of the lever 35 pivotally mounted therein, while the other arm is longitudinally slotted and receives the said lever therethrough. The bar 29 has a vertical opening 36 directly above the notch or recess 14, and slidable in this opening is the punch 37, which has its lower end beveled, as at 38, for engagement with the tooth of a saw, to bend said tooth down into the recess 14, whereby the set of the tooth is obtained. The upper end of this punch 37 is pivotally connected to a collar 39, which surrounds and is secured to the lever 35.

Formed in the mutually adjacent faces of the two transverse blocks 11, which are nearest the punch 37, are the sockets 41 and 42, respectively, and rotatably mounted or supported in these sockets are the opposite ends of the bolt or bar 43. Threaded on this bolt 43, adjacent the said punch 37, is a nut 44, and secured to the nut is the before-mentioned gage plate 18. Fixed on the other end portion of the bolt 43 is a knurled knob or collar 45, which is grasped to rotate the bolt, and thereby cause the nut to travel longitudinally of the bolt, for the purpose of setting the vertical wings 17, of the plate 18 opposite the desired marks of the scale 40.

Upon lifting upwardly on the outer ends of the adjusting plates 20 and 21, the bar 29 will be lifted bodily a short distance above the bar 13, so that the blade of the saw may be passed therebetween, with its toothed edge against the angular gage plates 18. This position of the saw disposes the teeth thereof over the recess, and in position to be engaged by the punch 37, when the lever 35 is depressed. The plate 18 is adjusted longitudinally in accordance with the scale 40, which is formed on the side face of the bar 29, for the purpose of regulating the device for setting teeth in different lengths. The nuts 24 and 25 are turned down to move the plates 20 and 21, and thereby cause the bar 29 to be lowered into close proximity with the saw blade. The stop bolt 28 being adjusted to the proper height, the lever 35 is moved downwardly, whereupon the punch 37 will press a tooth of the saw into the recess, thus bending the tooth to the desired set. The saw is moved transversely between the bars 13 and 29, until the next tooth to be set is over the recess, when the lever 35 is again depressed. The operation is then continued until all of the teeth have been properly set.

What is claimed is:

1. A saw-setting device including an anvil member, a punch member, a guide for the punch member, means for operating the punch member, means for adjusting the said guide toward and away from the anvil member, and means for regulating said adjusting means.

2. A saw-setting device including an anvil member, a punch guide above the anvil member, adjusting members connected with the anvil member and with said guide member, and means engaged with the adjusting members for moving said adjusting members.

3. A saw-setting device including an anvil member, a punch guide above the anvil member, adjusting members pivotally connected to the anvil member and to the guide member, and adjusting means engaged with the adjusting members for regulating the adjusting movement of the adjusting members.

4. A saw-setting device including an anvil member, having a saw-tooth setting recess, a punch guide above the anvil member, a punch slidable through the guide and into said recess, an operating lever connected to said guide and pivotally connected with said punch, gage means adjacent the anvil member, stop means for operating the lever, and means for adjusting the guide member toward and away from the anvil member.

In testimony whereof, I affix my signature, in the presence of two witnesses.

JOSEPH KEMPER.

Witnesses:
B. L. PENNINGTON,
GEO. WILLIAMS.